US011223696B2

(12) United States Patent
Schulz et al.

(10) Patent No.: US 11,223,696 B2
(45) Date of Patent: Jan. 11, 2022

(54) SYSTEM AND METHOD FOR INTEROPERABLE COMMUNICATION OF AUTOMATION SYSTEM COMPONENTS

(71) Applicant: ABB Schweiz AG, Baden (CH)

(72) Inventors: Dirk Schulz, Meckenheim (DE); Thomas Goldschmidt, Karlsdorf-Neuthard (DE)

(73) Assignee: ABB SCHWEIZ AG, Baden (CH)

( * ) Notice: Subject to any disclaimer, the term of this patent is extended or adjusted under 35 U.S.C. 154(b) by 9 days.

(21) Appl. No.: 16/848,859

(22) Filed: Apr. 15, 2020

(65) Prior Publication Data
US 2020/0333770 A1    Oct. 22, 2020

(30) Foreign Application Priority Data

Apr. 16, 2019   (EP) .................................... 19169376

(51) Int. Cl.
*G06F 13/00* (2006.01)
*H04L 29/08* (2006.01)
*G05B 19/418* (2006.01)

(52) U.S. Cl.
CPC ...... *H04L 67/2823* (2013.01); *G05B 19/4183* (2013.01); *G05B 19/4185* (2013.01); *G05B 19/4188* (2013.01); *G05B 19/41845* (2013.01); *G05B 19/41885* (2013.01)

(58) Field of Classification Search
CPC . H04L 67/2823; H04L 67/12; H04L 67/2833; H04L 67/2838; H04L 69/08; H04L 67/42; G05B 19/4183; G05B 19/41845; G05B 19/4185; G05B 19/4188; G05B 19/41885; H04W 4/70; G06F 16/258; G06F 16/24573

USPC ........ 709/227–229, 203, 217–219, 231, 230, 709/232–235, 223, 224
See application file for complete search history.

(56) References Cited

U.S. PATENT DOCUMENTS

| | | | |
|---|---|---|---|
| 8,977,707 B2* | 3/2015 | Dolph | G06Q 30/0251 709/217 |
| 10,320,885 B2* | 6/2019 | Chiussi | G06F 8/60 |
| 2007/0005801 A1 | 1/2007 | Kumar et al. | |

(Continued)

FOREIGN PATENT DOCUMENTS

| | | |
|---|---|---|
| CA | 2861754 A1 | 2/2016 |
| EP | 2091211 A1 | 8/2009 |

*Primary Examiner* — Kenneth R Coulter
(74) *Attorney, Agent, or Firm* — Leydig, Voit & Mayer, Ltd.

(57) ABSTRACT

A computer-implemented method for interoperable communication between a server and a client, at least one of the server and client being a component of an automation system, the server being associated with a corresponding server data model, and the client being associated with a corresponding client data model, includes: obtaining a reference to the server; analyzing structure and output of the server to derive, based on at least a first technical specification, one or more element types associated with elements of the server data model; generating at least a partial mapping between the server data model and the client data model by applying a transformation rule set to the server data model, the transformation rule set defining for the one or more derived element types how instances of the one or more derived element types are to be transformed from the server data model associated.

16 Claims, 14 Drawing Sheets

(56) References Cited

U.S. PATENT DOCUMENTS

| | | | |
|---|---|---|---|
| 2012/0030311 A1* | 2/2012 | Refai | G06F 16/254 709/219 |
| 2014/0082133 A1* | 3/2014 | Dolph | G06Q 30/0255 709/217 |
| 2014/0280476 A1* | 9/2014 | Chiussi | G06F 8/36 709/203 |
| 2016/0182304 A1 | 6/2016 | Schulz | |
| 2018/0205801 A1 | 7/2018 | Kovacs et al. | |

* cited by examiner

FIG. 8

*DeviceType Definition*

700

| Attribute | Value | | | | |
|---|---|---|---|---|---|
| BrowseName | DeviceType | | | | |
| IsAbstract | True | | | | |
| References | NodeClass | BrowseName | DataType | TypeDefinition | ModellingRule |
| Inherit the Properties of the TopologyElementType defined in clause 5.2 | | | | | |
| HasProperty | Variable | SerialNumber | String | PropertyType | Mandatory |
| HasProperty | Variable | RevisionCounter | Int32 | PropertyType | Mandatory |
| HasProperty | Variable | Manufacturer | LocalizedText | PropertyType | Mandatory |
| HasProperty | Variable | Model | LocalizedText | PropertyType | Mandatory |
| HasProperty | Variable | DeviceManual | String | PropertyType | Mandatory |
| HasProperty | Variable | DeviceRevision | String | PropertyType | Mandatory |
| HasProperty | Variable | SoftwareRevision | String | PropertyType | Mandatory |
| HasProperty | Variable | HardwareRevision | String | PropertyType | Mandatory |
| HasProperty | Variable | DeviceClass | String | PropertyType | Optional |
| HasComponent | Variable | DeviceHealth | DeviceHealth | BaseDataVariableType | Optional |
| HasComponent | Object | DeviceTypeImage | | FolderType | Optional |
| HasComponent | Object | Documentation | | FolderType | Optional |
| HasComponent | Object | ProtocolSupport | | FolderType | Optional |
| HasComponent | Object | ImageSet | | FolderType | Optional |
| HasComponent | Object | <Identifier> | | ConnectionPointType | OptionalPlaceholder |

SYSTEM AND METHOD FOR INTEROPERABLE COMMUNICATION OF AUTOMATION SYSTEM COMPONENTS

CROSS-REFERENCE TO PRIOR APPLICATION

Priority is claimed to European Patent Application No. EP 19 169 376.1, filed on Apr. 16, 2019, the entire disclosure of which is hereby incorporated by reference herein.

FIELD

The present invention generally relates to electronic data processing, and more particularly, relates to methods, computer program products and systems for interoperable communication with components of an automation system.

BACKGROUND

Modern automation system feature a multitude of different applications on all levels of the automation hierarchy during planning, engineering, commissioning, operations, maintenance, and re-configuration of a plant or factory. This includes, for example, basic closed loop control, production operation, alarm management, audit trails, device management, condition monitoring, process optimization, predictive maintenance, production scheduling, resource planning, demand-side energy management, data analytics, device configuration and other engineering tasks, etc. In such application scenarios, automation system components can be servers or clients. It is to be noted that servers as well as clients may perform the role of data providers or data consumers. For example, a first automation system component may expect a data input from a second automation component. There may also be scenarios where an automation system component receives an input from an application which is operated by a device communicatively coupled with the automation system, or where the automation system component provides an output to an application which is operated by a device communicatively coupled with the automation system. In many automation system environments the related servers and clients rely on a large amount of different communication and interface technologies (protocols) and different representations of the server and client data (server and client data models) to communicate and to interact. Some of such data models may adhere at least partially to certain technical standards. But also many of such automation system components have data models adhering to a proprietary technical specification, or may even have data models adhering to multiple standards and partially to a proprietary technical specification.

It is therefore a technical challenge to enable interoperable communication with this huge variety of automation system components. This has been addressed in the prior art by creating proprietary solutions or by creating protocol specific profiles in consensus-based standardization. However, such approaches lack flexibility when new automation system components are added providing and/or consuming information, e.g. new sensors or new data analytics applications, which are not compatible with the already existing solutions or profiles, or when additional standards arise. In both cases, the maintenance of the communication capabilities with automation system components is error-prone with a substantial risk for communication failures.

SUMMARY

In an embodiment, the present invention provides a computer-implemented method for interoperable communication between a server and a client, at least one of the server and client being a component of an automation system, the server being associated with a corresponding server data model, and the client being associated with a corresponding client data model, the method comprising: obtaining a reference to the server; analyzing structure and output of the server to derive, based on at least a first technical specification, one or more element types associated with elements of the server data model; generating at least a partial mapping between the server data model and the client data model by applying a transformation rule set to the server data model, the transformation rule set defining for the one or more derived element types how instances of the one or more derived element types are to be transformed from the server data model associated with the at least first technical specification into instances of the client data model associated with at least a second technical specification; and exchanging data between the server and the client via the at least partial mapping.

BRIEF DESCRIPTION OF THE FIGURES

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 8 illustrates a device type definition table; and

DETAILED DESCRIPTION

Figure 1A:
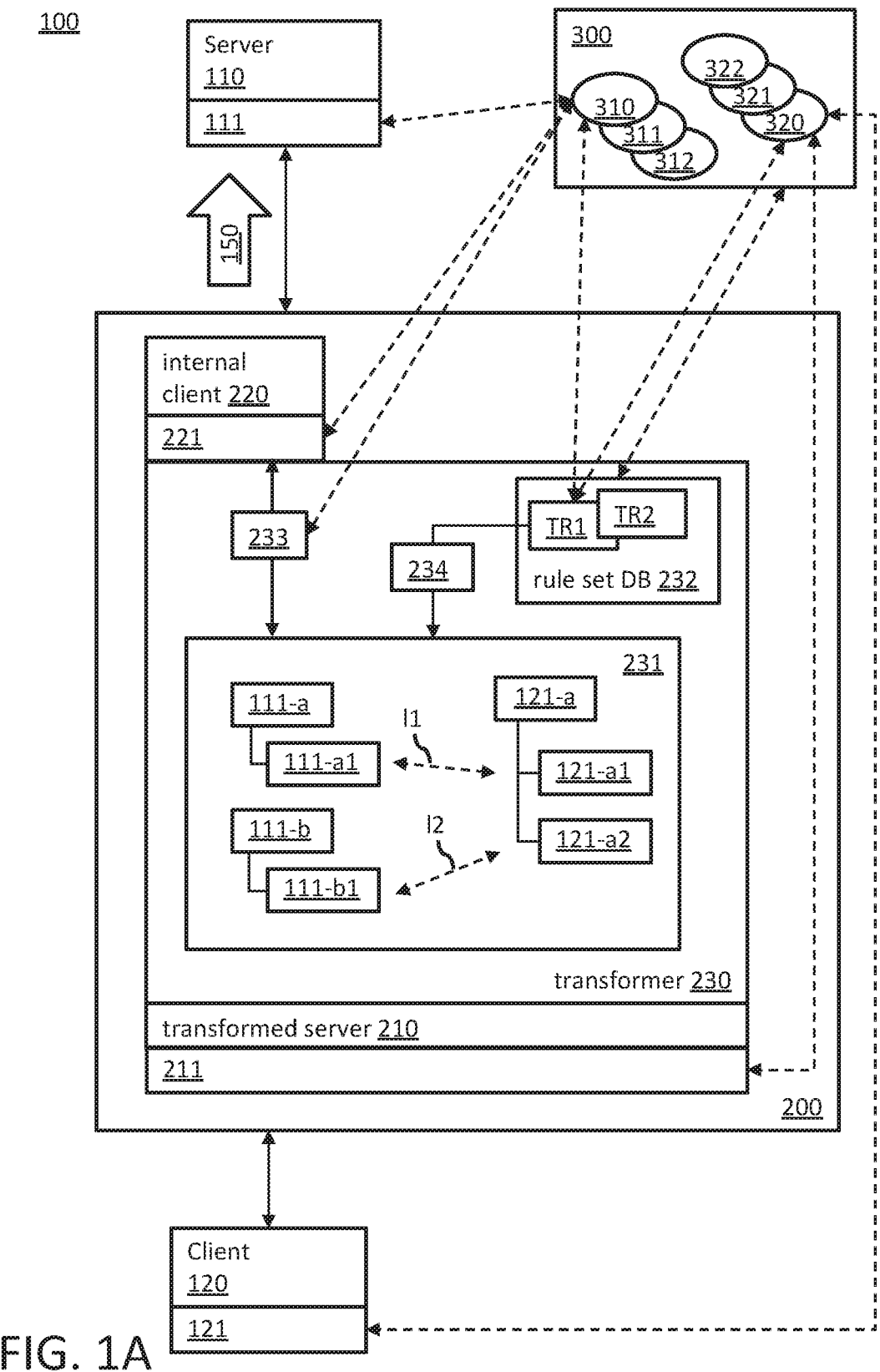
FIG. 1A is a block diagram illustrating a computer system for interoperable data exchange between a server and a client according to an embodiment.

There is a need to provide systems and methods for interoperable communication between a server and a client wherein at least one of the server and client is a component of an automation system. "Interoperable communication", as used herein, refers to a communication between server and client such that the communication partners can understand each other. That is, a communication where a first communication partner is sending data to a second communication partner where the data cannot be interpreted by the second communication partner (e.g., the data format is not understood by the other communication partner) is not falling under the term "interoperable communication". In such a case there may still be a communication in that the second communication partner sends back an error message to the first partner. However, no interoperable communication is established in such a case and no interoperable data exchange between the partners would be possible.

The system and method described herein allow interoperable communication between servers and clients in cases where the data models of servers and clients are different in a way which would prevent the communication partners from communicating successfully to collaborate or interoperate in a particular application context. Further, the present invention is robust in the sense that interoperable communication can be established between communication partners even if new automation system components with new data models are inserted (as data provider or data consumer).

In one embodiment, a computer-implemented method is provided. The method establishes interoperable communication between a server and a client. Thereby, both, the server and the client, can act as data provider or as data consumer. At least one of the server and client is an automation system component (e.g., a sensor, a controller, etc.). In some cases, the server and the client can be automation system components. For example, a temperature sensor may provide temperature data to a controller device of the automation system. In some cases, the data provider may provide the data to a data consumer which is communicatively coupled with the automation system. For example, the temperature sensor may provide its data to an external application which, for example, may be run by a data analytics system of an original equipment manufacturer (OEM). The data analytics system is however communicatively coupled with the automation system. In some cases, also the data provider can be such an external application providing data to an automation system component (data consumer). For example, a configuration application may provide device optimization configuration data from the OEM to a sensor of the automation system.

The server is associated with a corresponding server data model, and the client is associated with a corresponding client data model. The server may provide an output to serve as input for the client, or vice versa. Therefore, the respective outputs needs to be provided to the corresponding data consumer in a format which can be understood by the data consumer so that the data consumer can further process the data received from the data provider. The method starts with obtaining, by a communication module, a reference to the server. The reference is obtained by a computer system which is configured to perform the transformation (or translation) between the server and client data models.

In general, a server may actively notify the computer system of its availability with a corresponding reference, the computer system may request a notification from single servers or from groups of servers, or the computer system may actively scan such servers or groups of servers. For example, the reference may be obtained from a manual input received from a user (e.g., an operator of the automation system) or it may be obtained automatically by using a discovery mechanism which is adapted to discover servers associated with the automation system. In one implementation, the server may actively indicate its availability and may actively send its reference to the computer system. For example, when using a discovery mechanism, a discovery module may perform the discovery with a discovery mechanism adapted for the automation system to discover available servers of the automation system, and then may receive references to the discovered servers including the reference of said data provider. In one implementation, the server may register itself with a local or global (predefined) OPC UA discovery server. In one implementation Multi-Cast DNS (mDNS) according to RFC 6762 may be used. Other decentralized protocols based on network broadcasts may be used as well.

The transformation computer system is further communicatively coupled with a technical specifications database. Such technical specification can include standard specifications or proprietary specifications (i.e., non-standard specifications, such as for example, manufacturer-specific specifications) describing properties of automation system components. Such technical specifications comprise technology standards, such as for example, the IP-based communication standard OPC UA (Open Platform Communications Unified Architecture), FDI (Field Device Integration) for standardized access to field devices in automation systems, or PROFIdrive application profiles defining the device behavior and the process for accessing drive data of electric drives on PROFIBUS and PROFINET. Further, the technical specification may comprise all kinds of proprietary specifications used by automation system components as defined by the producers of the components. For example, the same system component (e.g., a temperature sensor) can be described differently by different technical specifications. Typically, the data models of the server and client follow one or more technical specifications. In other words, the server data model may adhere to one or more technical standards (or proprietary specifications) and the client data model may adhere to one or more different technical standards (or proprietary specifications). In such a scenario, the client and server cannot communicate with each other. In other words, the server and client follow different meta-models describing properties of either a data provider or a data consumer in accordance with one or more respective technical specifications.

The computer system has a transformer module which is configured to execute model transformations between the server and client data models to enable the interoperable communication between server and client. Thereby, the transformation is based on rules which are defined at the level of data types (element types) as defined in the respective technical specifications. The transformer has an analyzer to analyze structure and output of the server to derive, based on at least a first technical specification provided by the technical specifications database, one or more element types associated with elements of the server data model. In other words, the analyzer can look into the structure and output of the server (via the obtained reference) and use a corresponding technical specification (meta-model) to which the server data model adheres to derive said one or more element types. The analysis based on the at least first technical specification may be directed to any one of the data model structure elements and analyze corresponding namespaces, annotations, semantic annotations referencing technical specifications, object types, type hierarchies, type/instance relationships, and references within the server data model.

In one embodiment, the analyzer may execute a conformance test associated with the at least first technical specification to validate the conformance of the server data model with the at least first technical specification prior to deriving the one or more element types. During the conformance text, the analyzer checks if the server data model adheres to one or more of the technical specifications stored in the technical specifications database. For example, a server may include an annotation with an explicit reference to a technical standard. The analyzer can then check if the actual server data model really complies with the respective standard as specified in the technical specifications database. This improves the reliability of the corresponding element type derivations and therefore can improve a selection of transformation rule sets providing appropriate transformation packages for the server.

The transformer further has a rule set database with a plurality of transformation rule sets associated with the technical specification database. A particular transformation rule set has one or more transformation rules defining, for one or more element types derived from the server data model, how instances of said element types are to be transformed from the server data model associated with at least a first technical specification into instances of the client data model associated with at least a second technical specification of said technical specification database. That is, the transformation rules are defined at the type level of the respective meta-models and can be applied to a respective data model to transform all instances of the corresponding type in accordance with the respective transformation rule. Thereby, a transformation rule defines a transformation between instances of a first type in relation to a server related technical specification and instances of a second type in relation to a client related technical specification. In other words, a data provider may offer information in compliance with one or more technical specifications that a given data consumer does not directly understand. However, the data consumer may understand information according to (at least partly) different known technical specifications. The transformation rule is now able to translate data following the relevant technical specifications of the provider into data following the specifications understood by the consumer. The generated mapping is a bi-directional mapping which can be used to exchange data between server and client in both directions. That is, the same mapping can be used for the communication between client and server when the client is the data consumer and the server is the data provider, or when the client is the data provider and the server is the data consumer. Exchanging data includes any one of: reading variable values, writing/updating variable values; creating or deleting variables, structural objects, references between objects and/or variables; creating or deleting data, variable, object, or reference types; publishing and receiving the values of variables or topics; publishing, receiving, and acknowledging alarms or events; calling methods or remote procedures.

A rule engine of the transformer applies the particular transformation rule set to the server data model to generate at least a partial mapping between the server data model and the client data model. The mapping is generated at the instance level for all model elements which are instantiated from the respective type to which the particular transformation rule applies. A particular transformation rule matches at least a part of the structure and output of the data provider if the particular transformation rule defines a transformation of a first element type of at least one element of the provider data model or output into a second element type of at least one element of the consumer data model or input with the first and second element types being defined in corresponding first and second technical specifications, respectively. The model elements can include structural elements of the communication partners (e.g., fields) and values (e.g., measurement values of a sensor). Via the at least partial mapping of the transformer, the server and client can now exchange data even with client and server data models adhering to entirely different meta-models (as reflected by the corresponding technical specifications).

In one embodiment, the computer system has an internal client (proxy) to replicate at least partially the server data model. It may be advantageous to store parts of the server data model on the transformation system itself if such parts are subject to a transformation for interoperable communication. The partially replicated server data model is referred to as ingestion model which is associated with the at least first technical specification being used as input for the transformer module. The internal client with its ingestion model can be seen as a façade of the transformer to communicate with the server. In one implementation, a further server may provide a further server data model. In this implementation, generating the ingestion model includes concurrently storing the server data model and the further server data model. It is therefore possible to aggregate multiple server data models via the ingestion model of the internal client.

The transformer module may further instantiate a transformed server associated with the at least second technical specification to provide a transformed output of the server to the client in accordance with the client data model. The transformed server with a data model replicating at least partially the client data model can be seen as a façade of the transformer to communicate with the client. Façade, as used herein, refers to the appearing of the original server to the client under the data model of the transformed server which is different from the data model of the original server. That is, for the client the transformed server provides a data model which is understood by the client and the client does not even know of the incompatible data model of the original server. In other words, when the server acts as data provider, the instantiated transformed server represents a new data provider whose output is the transformed output of the server based on said generated mapping, and compatible with the consumer data model. The transformation module can now propagate data from the output of the original data provider to the output of the new data provider via the at least partial mapping and provides the updated output to the data consumer. The at least partial mapping of the instantiated new data provider establishes connections between the output of the original data provider and the input of the data consumer through which respective values of the original data provider are communicated to the data consumer in a format which is understood by the data consumer.

In a typical scenario, the server data model is different from client data model and the transformation via the internal client/transformed server provides the respective translation between the communication partners. In other scenarios, the data model of a server may be equal to the data model of the client but the client expects data input from multiple servers all having the same device type (e.g., multiple temperature values measured by a plurality of temperature sensors of the same type). In such scenarios, typically an ingestion model is created which aggregates the data models of the respective servers. In general, the aggregated ingestion data model is different from the client data model also in such cases where the original server data models were the same as the client data model. Therefore, also in such a scenario the transformation of the ingestion model is necessary to provide understandable, standard-confirming input to the client. In such scenarios the aggregated ingestion model corresponds to the data model of an intermediate server. The intermediate server is a virtual server aggregating the information of multiple real-world servers.

In one embodiment, the internal client of the transformation system is configured to monitor changes in the output and/or model structure of the server (or multiple servers when aggregated in an ingestion model). If an output change is detected, the transformation system can trigger a data update via the generated mapping. If a model structure change is detected, the transformation system can trigger a model transformation to modify the mapping. The monitoring function allows to keep the transformation module up-to-date and automatically readjust the transformation mapping to model changes occurring at the monitored server(s). Further, any value changes occurring in the output are immediately propagated to the other communication partner via said mapping. In cases where the mapping is readjusted based on detected model structure changes, it may be advantageous to execute transformation rules only on model elements of the server which are affected by the detected changes. This saves processing power by avoiding unnecessary processing by the rule engine which would occur when executing all transformation rules matching the server data model as a whole.

For example, when a change is detected (e.g., because a new automation system component is inserted), the transformation module may instantiate a further new data provider with a corresponding transformation server. The transformation module can then either switch the data propagation to the output of the new transformation server, or replace the current transformation server by the new transformation server. In this embodiment, the transformation module ensures that there is no disruption in the data propagation caused by the detected changes. Only after the respective new data provider (new transformation server) has been fully instantiated the communication is routed via this new instance.

In another embodiment, detected changes of the data provider output are continuously merged into the output of the initially instantiated transformed server. Also in this embodiment, a change of the server data model or its output, or a new server data model is detected. A new transformation server with a corresponding output is instantiated. The changes of the output of the new transformation server are now merged into the output of the original transformation server and the data is propagated to the merged output. Again, this embodiment avoids any disruption in the communication when changes are detected on the server side affecting the output (values) of the original server.

In one embodiment, when a failure of a particular data provider is detected which affects one or more output values of the new data provider, the communication module may annotate the one or more affected output values with a respective bad-data-quality indicator while freezing the value associated with the good-data-quality state of the particular data provider. This allows the data consumer to disregard data of poor quality.

In one embodiment, upon reconnection to a previously failed server, a model change event log on the server is analyzed to determine whether a gapless history of server model changes can be built. If this is not the case, then the entire source model is explicitly analyzed for changes. This embodiment may be advantageous in scenarios with incremental transformation when the changes of the server are known. For example, if communication between the transformation system and the server is interrupted certain changes may not be received by the monitoring internal client. In this case the server can be queried for recent changes which are recorded in the model change event log of the server and an incremental transformation may be triggered. If the model change event log is shorter than the disruption of the communication the event log does not provide sufficient information regarding the parts of the model which need to be transformed with an incremental transformation. In this case the entire model needs to be subject to the transformation.

In one embodiment, the monitoring function of the transformation system detects a failure of the server affecting one or more output values of the transformation. The one or more affected output values may then be annotated with a respective bad-data-quality indicator while freezing the value associated with the good-data-quality state of the particular server. This may be advantageous compared to direct connections where the data model including the last good values disappears when the corresponding data provider disappears.

Figure 1B:
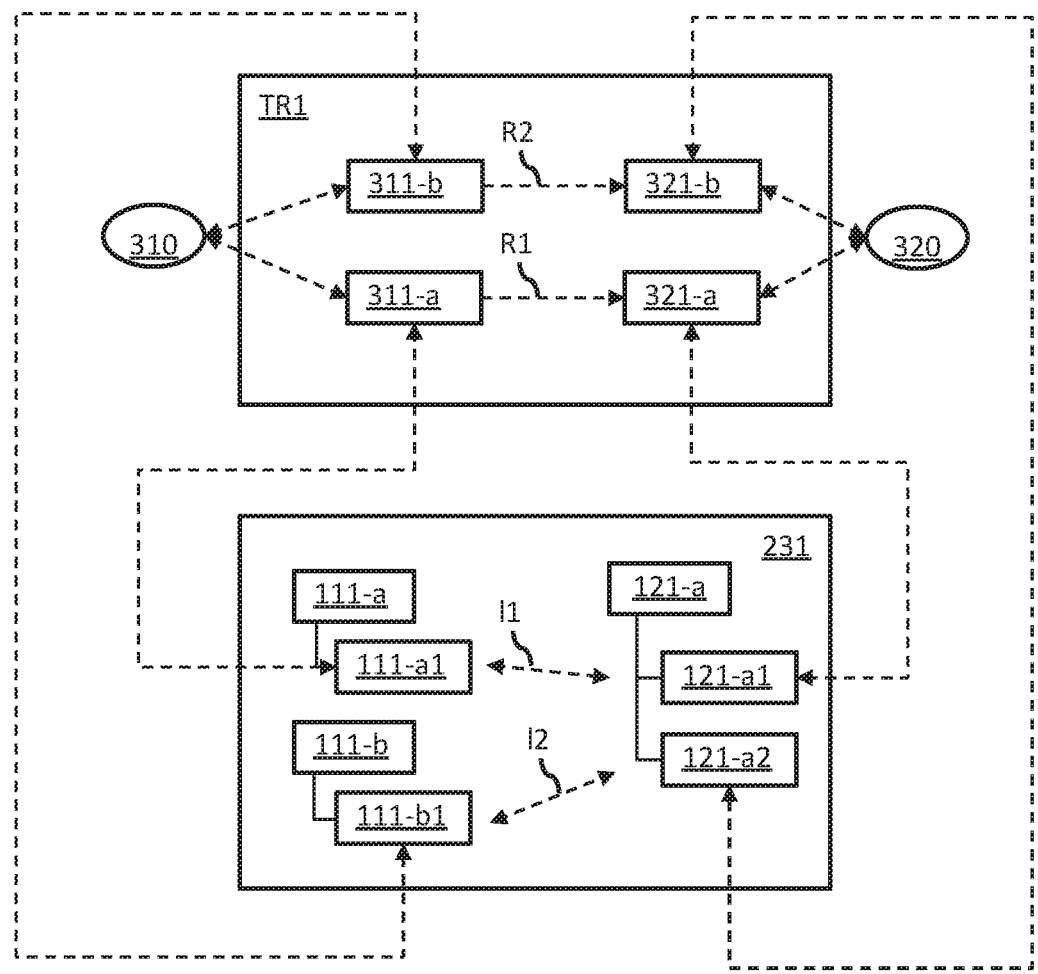
FIG. 1B illustrates details of a transformation module according to an embodiment.
Figure 2:
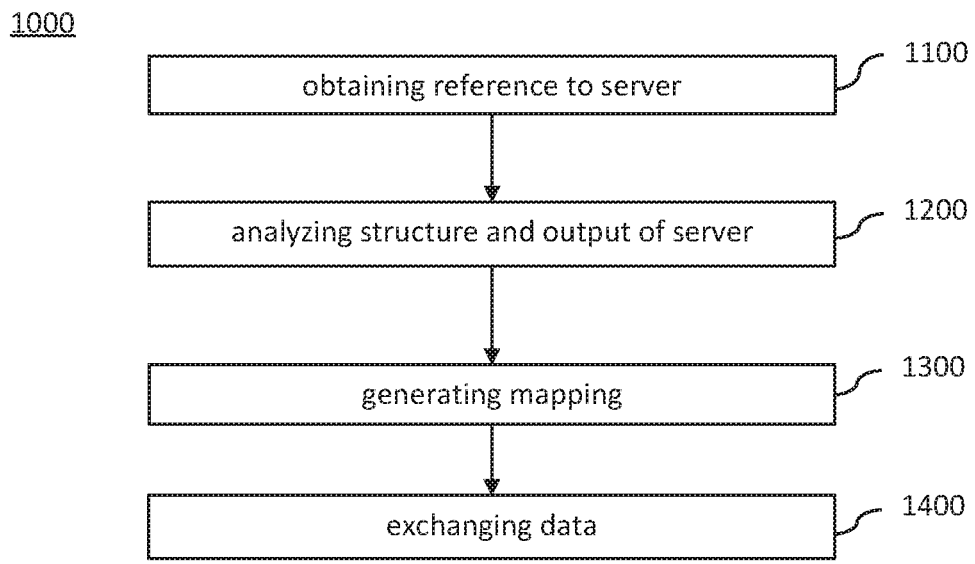
FIG. 2 is a simplified flow chart of a computer-implemented method for interoperable data exchange between a server and a client according to an embodiment.

FIG. 1A is a block diagram illustrating a computer system 200 for interoperable data exchange between a server 110 and a client 120 according to an embodiment. FIG. 1B illustrates details of a transformation module 230 of the computer system 200 according to an embodiment. FIG. 2 is a simplified flow chart of a computer-implemented method 1000 for interoperable data exchange between the server and the client according to an embodiment. The computer-implemented method 1000 is executed by at least one processor of the computer system 200 by processing corresponding instructions of a computer program which is loaded into a memory of the computer system 200. FIG. 1A is now described in the context of FIG. 1B and FIG. 2. Therefore, the following part of the description includes reference numbers of all three figures.

The computer system 200 is connected to a network (e.g., a local area network or a wide area network such as the Internet) which allows the computer system 200 to communicate with other components of the network. Potential communication partners, such as the server 110 and the client 120, are connected to the same network. At least one of the server and client is a component of an automation system (e.g., a sensor, a controller, etc.). The other component may also be a component of the automation system or it may be a component associated with the automation system (e.g., a maintenance application, a configuration application or the like). The server 110 is associated with a corresponding server data model 111, and the client 120 is associated with a corresponding client data model 121. The server data model 111 and the client data model 121 may be different. With different data models the server and the client cannot directly communicate with each other because they talk different languages (as defined by the different data models) and could not understand each other. The computer system 200 provides a transformation capability which can translate the language of the server 110 into the language of the client 120 (and vice versa) by transforming the data models into transformed data models in accordance with one or more technical specifications which are compatible with the data model of the respective component. A technical specification being compatible with the data model of a component can be seen as a meta-model to which the data model adheres. It may be that the data model of a component (client, server) adheres to multiple technical specifications. In other words, a first part of the data model may follow a first meta-model associated with a first technical specification and a second part may follow a second meta-model associated with a second technical specification. The transformer 230 of the computer system is able to handle such situations by using transformation rules TR1, TR2 in a rule set database 232 which are associated with respective technical specifications 300.

To establish an interoperable communication between the server 110 and the client 120, the computer system initially obtains 1100 a reference 150 to the server to establish a communication between its communication interface and the server 110 via the obtained reference 150. In one implementation, the reference 150 may be received as a manual input from a user. In another implementation, the computer system may use a proxy, also referred to as internal client 220 herein, to performing a discovery using a discovery mechanism adapted for the automation system to discover available components of the automation system. The discovery results in references to the discovered components received by the internal client 220. If the server 110 is amongst the discovered components the received references include the reference 150 of said server 110. The computer system can now access the server 110 and retrieve information regarding the server data model 111 via the reference 150. In one embodiment, internal client 220 may generate an ingestion model 221 replicating at least partially the server data model 221. The ingestion model 221 can be seen as the data model of the internal client and is stored on the computer system 200. For the following model transformation it can be advantageous to store at least such parts of the server data model in the ingestion model 221 which are to be used as the input for generating 1400 a mapping 231 between the client and server data models. This avoids further round trips to retrieve transformation relevant details of the server data model one by one.

The transformer module 230 has an analyzer 233 configured to analyze 1200 structure and output of the server 110. In case the internal client 220 has an ingestion model with the transformation relevant parts of the server data model the analysis can be performed on the ingestion model 221. Otherwise, the server data model 111 can be analyzed via the reference 150. The server data model 111 is associated with one or more technical specifications 310 of the technical specifications database 300. Based on at least a first technical specification 310, the analyzer 233 can derive one or more element types associated with elements of the server data model 111. Any one of the data model structure elements like, for example, namespaces, annotations, semantic annotations referencing technical specifications, object types, type hierarchies, type/instance relationships, and references within the server data model 111 may be used for the analyzing 1200 of the server structure and output. In one embodiment, the analyzer may simply try various technical specifications 310, 311, 312 until a particular technical specification 310 matches the server data model 111 (or the ingestion model 221) which is then used for deriving the model element types. In another embodiment, the analyzer may search for indicators in the server data model 111 which point to respective technical specifications. For example, the name of a model element may include a string which corresponds to the name of a particular technical specification. In this case, this particular technical specification is used for model element type derivation. Other indicators may be useful, too, such as for example a similarity between variable names in the server data model 111 and the technical specification.

In case the analyzer cannot unambiguously identify at least one technical specification matching the server data model 111, the analyzer may execute a conformance test prior to deriving the one or more element types. In the conformance test, the analyzer validates the conformance of the server data model 111 with one or more of the technical specifications 310, 311, 312 to identify at least one technical specification which matches the meta-model to which the server data model 111 adheres. Such validation can make use of all of the above mentioned data model structure elements and compare such elements with the model structure elements of the various technical specifications. If at least parts of the server data model show a similarity with the corresponding model structure elements of a corresponding technical specification above a predefined similarity threshold value, the corresponding technical specification is used for the derivation of the corresponding model element types.

The transformer 230 further has a rule set database 232 which stores a plurality of transformation rule sets TR1, TR2 associated with the technical specification database 300. A particular transformation rule set TR1 has one or more transformation rules R1, R2 (cf. FIG. 1B) which can be executed by a rule engine 234 of the transformer. A particular rule R1, R2 defines, for a particular element type 311-a, 311-b derived from the server data model, how instances 111-a1, 111-b1 of said element type are to be transformed from the server data model 111 associated with a first technical specification 310 into instances 121-a1, 121-a2 of the client data model 121 associated with a second technical specification 320. In other words, the transformation rules R1, R2 are defined at the level of model element types and apply to all instances of the respective model element types. Because the rules are associated with the technical specifications it is possible to have transformation rules in place which are applicable to components which are not even present in the automation system yet. Once a device is plugged into the automation system and is discovered, the computer system checks if the device adheres to a meta-model following any one of the technical specifications in the technical specification database, and if yes, the transformation rules which are defined for the model element types of the corresponding technical specification can immediately be applied to the new system component (device). When the rule engine 234 executes the rules R1, R2, a mapping 231 between the instances of the corresponding model elements is generated 1300.

In the example of FIG. 1B, Rule R1 defines a transformation in relation to the model element type 311-a which is associated with the technical specification 310 in accordance with the meta-model followed by the server data model 111, an in relation to the model element type 321-a which is associated with the technical specification 320 in accordance with the meta-model followed by the client data model 121. The transformation rule R1 is then applicable to all instances of such model element types. In the example, the server data model has a model element 111-a1 (child of model element 111-a) which is an instance of the type 311-a. The client data model has a model element 121-a1 (child of model element 121-a) which is an instance of type 321-a. Executing the rule R1 with the rule engine applies the rule to all instances of the respective model element types and, in the example, lead to the generation of a mapping relation I1 between the instances 111-a1 and 121-a. Similarly, the mapping relation I2 is generated between the server data model element 111-b1 (child of sever data model element 111-b) and the client data model element 121-a2 by executing the transformation rule R2 in relation to model element types 311-b and 321-b associated with technical specifications 310 and 320, respectively.

When the rule engine 234 applies a particular transformation rule set TR1 to the server data model 111 it generates at least a partial mapping 231 between the server data model 111 and the client data model 121. For example, if only a subset of the model elements of the server data model is replicated in the ingestion model 221 of the internal client, the mapping 231 may only be generated for the model elements provided by the ingestion model.

The efficiency for generating the mapping at the instance level may further be improved by an embodiment where the internal client 220 monitors changes in the output and/or model structure of the server 110, and triggers a model transformation to modify the mapping 231 only in cases where a model structure change is actually detected. The efficiency can be further improved when the rule engine executes transformation rules only on model elements of the server which are actually affected by the detected changes. This can save processing capacity of the computer system 200 which otherwise would be used for the regeneration of already existing and unchanged mapping relations.

Once the mapping 231 is established between the model elements of the server and client data models a data exchange between the server 110 and the client 120 is executed via the at least partial mapping 231 through respective interfaces of the computer system 200. Thereby, in one embodiment, the efficiency of data propagation from the server to the client can also be improved when using the monitoring function of the internal client 220. If the internal client detects an output change at the server 110, the client can trigger the corresponding data update only for the changed data values. This may be achieved by the instantiating a transformed server 210 associated with the at least second technical specification 320 to provide a transformed output of the server 110 to the client 120 in accordance with the client data model 121. The data propagation of the detected value changes can then occur from the server output to the transformed output of the transformation server 210 which provides the updated value changes to the client in accordance with the data model 211 of the transformed server in line with the meta-model (technical specification 320) which is followed by the client data model 121.

Figure 3:
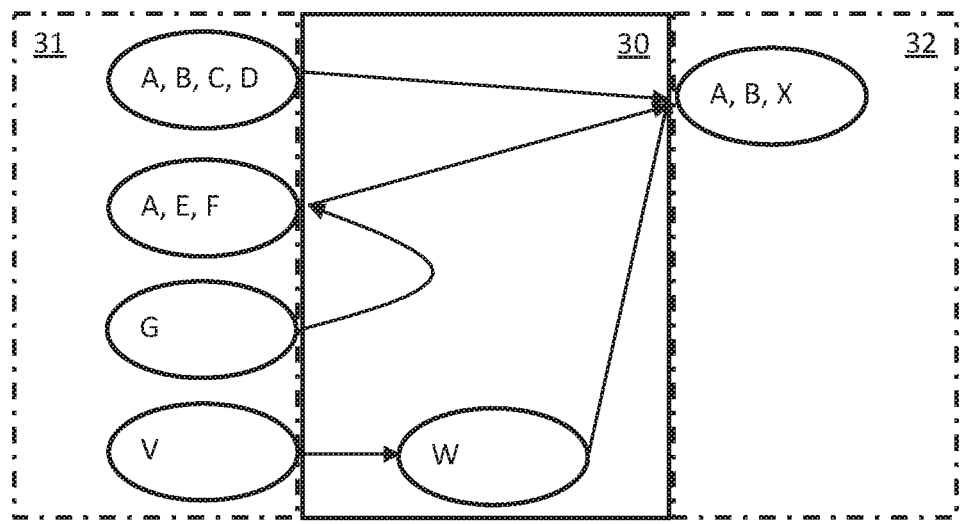
FIG. 3 illustrates transformation options between various technical specifications.

FIG. 3 illustrates the use of multiple technical specifications for model transformation between server and client data models. In the example of FIG. 3, the technical specifications database includes technical specifications (meta-models) A, B, C, D, E, F, G, V, W, X. Combinations of some of these specifications may occur as "language packages" for respective server specifications 31. For example, a first language package includes the specifications A, B, C, D. That is, the data model of a corresponding server follows at least in part all four meta-models A, B, C, D. A second language package includes the specifications A, E, F. The server specification G and V are not combined with further specifications. The model transformation module 30 can handle all such server language packages with corresponding transformation rule packages and transform the respective server outputs into a format which is understood by the client. The client in this example is the data consumer and requires a data input in accordance with the language package A, B, X (client specification 32). That is, any transformation of a server data model into an A, B, or X client data model will lead to interoperable communication between server and client. The transformation 30 may include transformation rules which can directly transform a server data model into the corresponding client data model. In the example, servers with language packages following the meta-models A, B, C, D and A, E, F are directly transformed into the client data model following the meta-models A, B, X with corresponding transformation rule sets. Of course there is no need to perform a transformation from A to A. There is no need that the transformation results in a data model which makes use of all three specifications A, B, X as understood by the client. For example, all data model elements of the server may be mapped to client data model elements which follow only one of the respective client data model specifications. For example all server data elements may be mapped to client data elements following the A meta-model.

For the server specifications G and V no direct transformation rules exist. However, the transformation module 30 has rules which are able to transform the server specification G into the server language package A, E, F which can then be directly transformed into the client data model. That is, the transformation process can also be a multistage transformation process where an initial server language package is first transformed into an intermediate language package for which a final transformation rule set is the available to generate the mapping to the client data model. The transformation of the server specification V into the client specification A, B, X via an intermediate specification W is a further example of such a multistage transformation. In this example, the intermediate specification W is neither a server specification nor a client specification but a mere internal specification format for transformation purposes only.

FIGS. 4A to 4D and 5A, 5B illustrate a particular example of a model transformation where multiple servers in the form of temperature transmitters provide data to a temperature monitoring application (client). For example, the temperature transmitters (servers) may have a OPC UA DI data model (the OPC-UA Device Integration information model). In this example, the client also operates based on a OPC UA DI data model. At a first glance it may look as if no transformation capability is needed. However, the example illustrates the aggregation of multiple temperature transmitters (servers) into a single ingestion model. The aggregated ingestion model finally includes an aggregate data model which is not compatible with the DI client anymore and transformation is required to exchange data between the servers and the client. For OPC UA Namespaces, namespace plus local object id must be globally unique, i.e., the same namespace+id means the same object. Namespace indices are only local "short names". That is, the namespace indices are not unique across servers. In the example this is done only for easier reading. The standardized namespaces used are referenced by "0:" to "3:" with:

0: http://opcfoundation.org/UA/
1: http://opcfoundation.org/UA/DI/
2: http://fdi-cooperation.com/OPCUA/FDI7/
3: http://opcfoundation.org/UA/ProcessAutomationDevice/

Figure 4A:
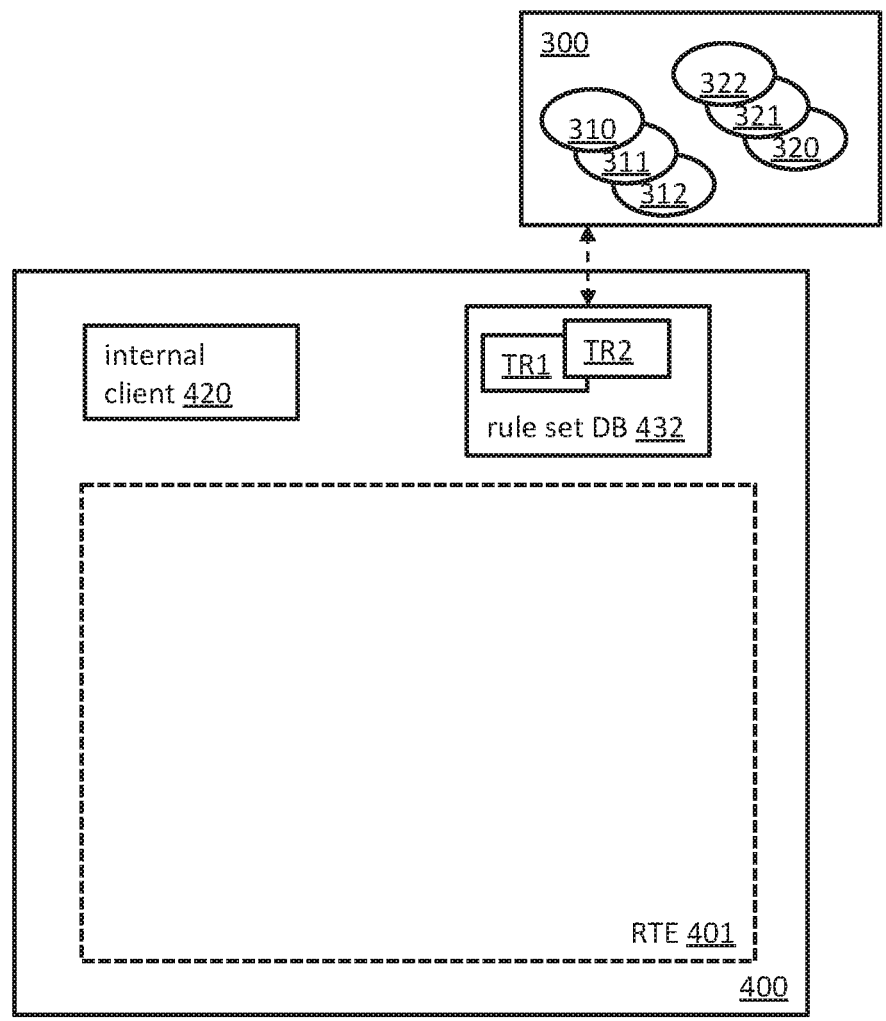
FIGS. 4A to 4D illustrate a specific transformation example involving a temperature transmitter.

The Process Automation Device Information Model (PADIM) is described in detail, for example, in the technical white paper obtainable at:
https://www.fieldcommgroup.org/sites/default/files/technologies/PA%20DIM%20white%20paper%201.0.pdf Server specific namespaces used in the example are:
11: t1.company.com
12: t2.company.com
21: padim.company.com FIG. 4A illustrates a computer system 400 which has an internal client (proxy) component 420 and a database 432 with transformation rule sets TR1, TR2. The rule set database 432 is associated with the technical specifications 300 (e.g., server technical specifications 310 to 312 and client technical specifications (320 to 322) as described earlier. At this initial setup stage, the transformation computer system 400 includes a runtime environment 401 (RTE) but no mapping has been generated yet.

Figure 4B:
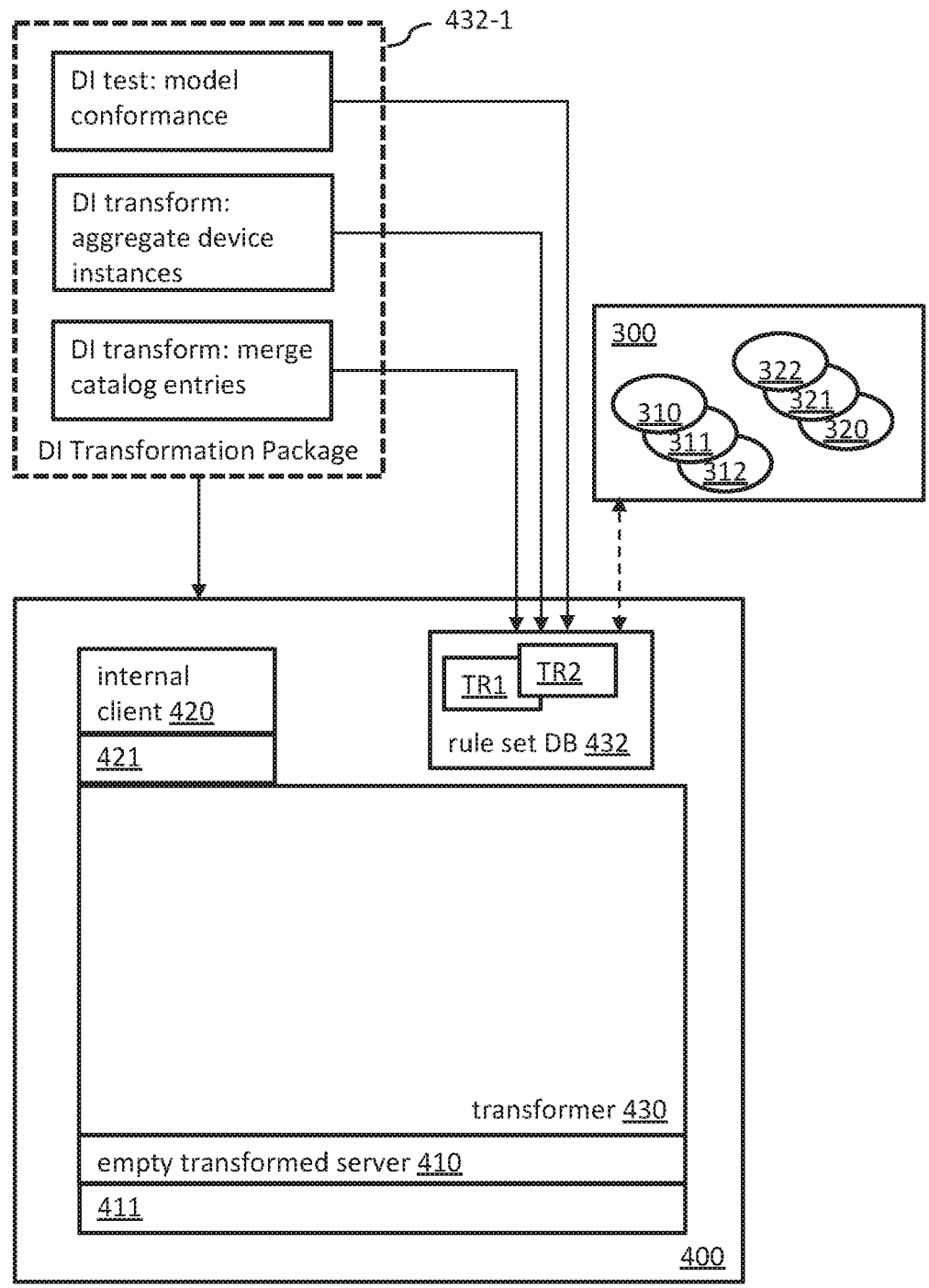

In FIG. 4B, a transformation rule package 432-1 (DI Transformation) is loaded into the rule set DB 432. In the example, the rule package 432-1 includes three transformation rule sets: "DI test: model conformance", "DI transform: aggregate device instances", and "DI transform: merge catalog entries". Thereby, the first rule set includes rules to perform a conformance test on a server data model to check whether the model follows the DI meta-model, whereas the second a third rule sets include transformation rules to generate mappings between server and client data models. After an initialization, the rule set DB may already include all available transformation rule sets. However, additional transformation rule sets may also be loaded during the operation of the computer system 400 once they become available. In general, the belonging of particular transformation rules to a particular transformation rule set is visible in the rule set DB 432. However, the rule engine for executing the rules can directly access the particular transformation rules of the particular transformation rule set for processing. The RTE 401 starts new transformer (instance) 430 for DI aggregation under reference to the rule package 432-1. Initially the transformed server 410 includes a new (empty) output. Such a new, empty transformer is not yet ready for data exchange but waits to receive matching server data models to translate. As at this point in time neither a server nor a client are known by the computer system 400 as potential communication partners, the data models 421, 411 of the internal client 420 and the transformed server 410 are still empty.

Figure 4C:
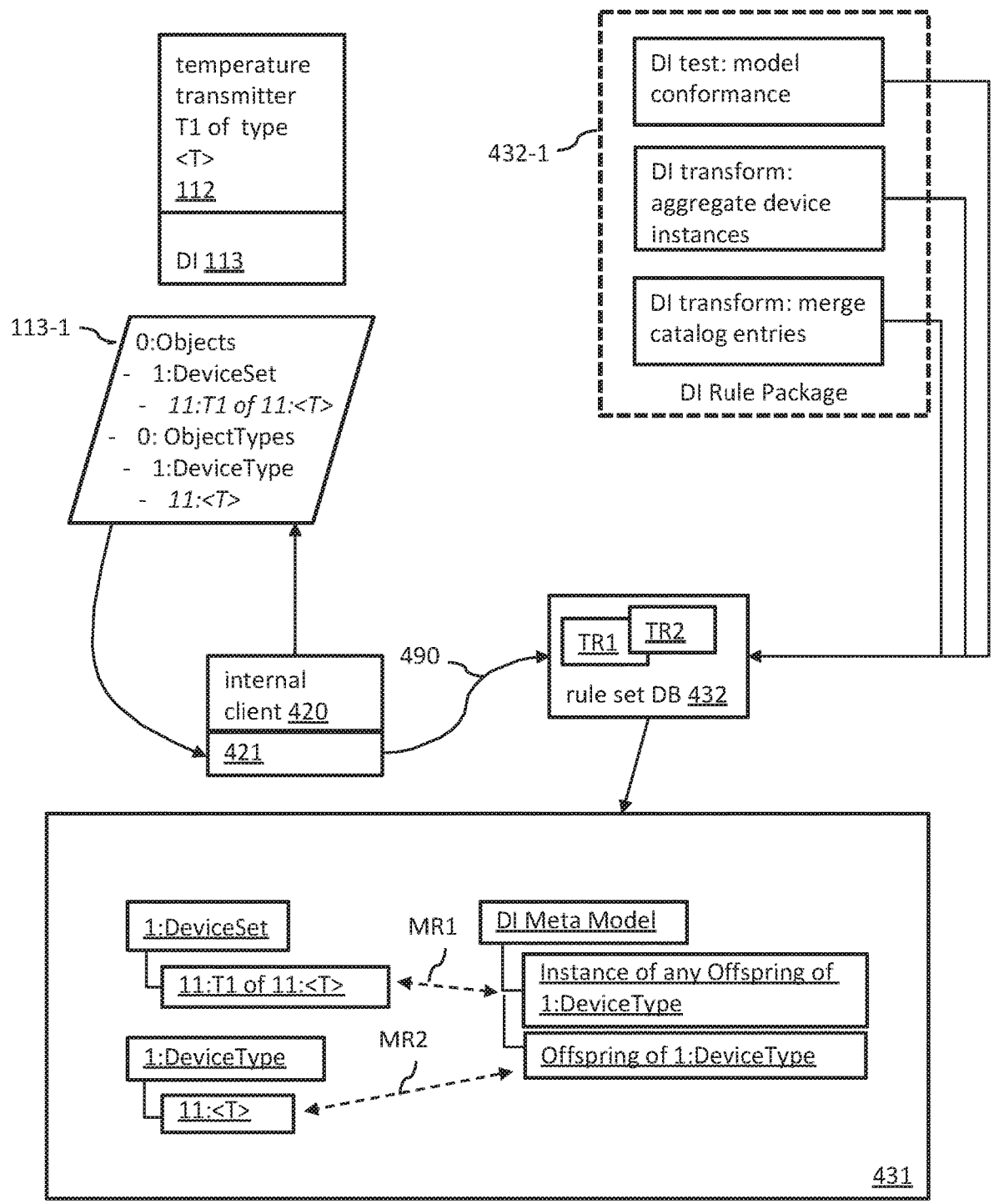

In FIG. 4C, a server 112 is plugged into the automation system and the transformation computer system obtains a reference to the server 112. In the example, the server 112 is a temperature transmitter T1 of type <T> with a data model 113 adhering to a technical specification DI. The temperature transmitter T1 may be discovered by the computer system or a reference may be directly provided to the system via user input. The server data model 113 in the example has the following structure 113-1:

```
-0:Objects
  - 1:DeviceSet
    - 11:T1 of 11:<T>
  - 0: ObjectTypes
    - 1:DeviceType
      - 11:<T>
```

The internal client 420 can now load at least parts of the server data model 113 into the ingestion model 421 (data model of the internal client) and provide the corresponding structure information 113-1 as input information to the transformer. The analyzer of the transformer may perform a conformance test on the ingestion model 490 using the reference to the "DI test" rule set of the rule package 432-1 to validate the applicability of the DI rule package for a potential transformation of the server data model 113. In other words, the conformance test can check whether the server data model follows the DI meta model which is the case in the example.

The analyzer now derives model element types for the model elements of the server data model in accordance with the DI specification. In the example, the model element type (of the DI meta model) associated with the device identifier "11:T1 of 11:<T>" in the server data model is "Instance of any Offspring of 1:DeviceType". The model element type associated with the device type identifier "11:<T>" is "Offspring of 1:DeviceType". In other words, the analyzer infers the relevant meta-model references MR1, MR2 between the model elements in the server data model and the corresponding model element types as defined in the meta-model (technical specification DI). Device types, such as device type <T>, are derived from the standardized "DeviceType" but can reside in a server-specific namespace. Devices are instances of their respective (derived) device type.

Figure 4D:
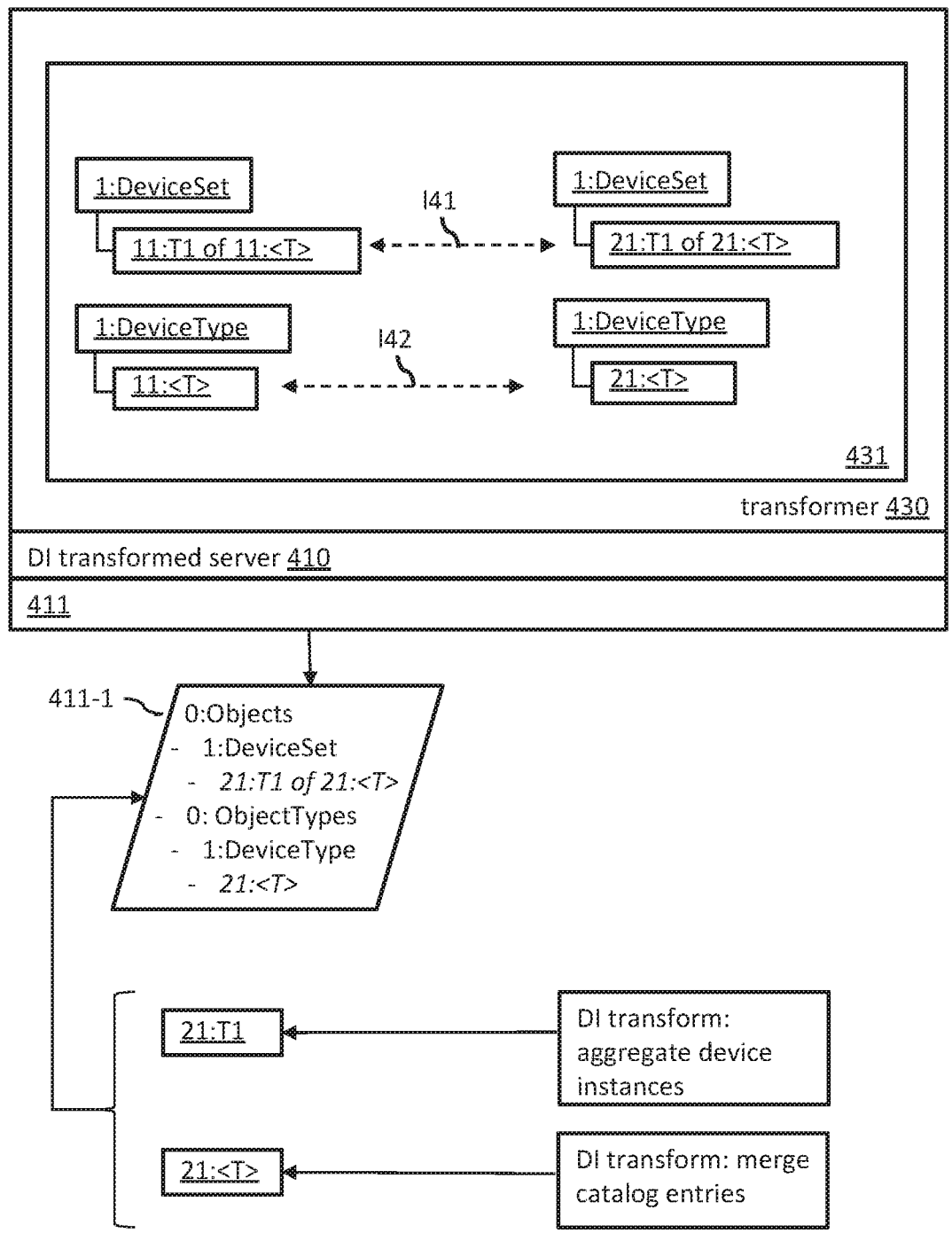

FIG. 4D illustrates the generated mapping 431 between corresponding model elements as a result of the application of the transformation rules. The mapping relation I41 is generated between the device set instances 11:T1 of 11:<T> and 21:T1 of 21:<T>. The mapping relation I42 is generated between the device type instances 11:<T> and 21:<T>. Further, the transformed server 410 is instantiated with the data model 411 which shows the structure 411-1 of the client data model. The instantiated transformed server 410 corresponds to a façade built by the transformer 430 to provide the transformed output of the server 112 to the client. The output of the transformed server 410 shows conformance with the DI data model as implied by the namespace "1:"

Figure 5A:
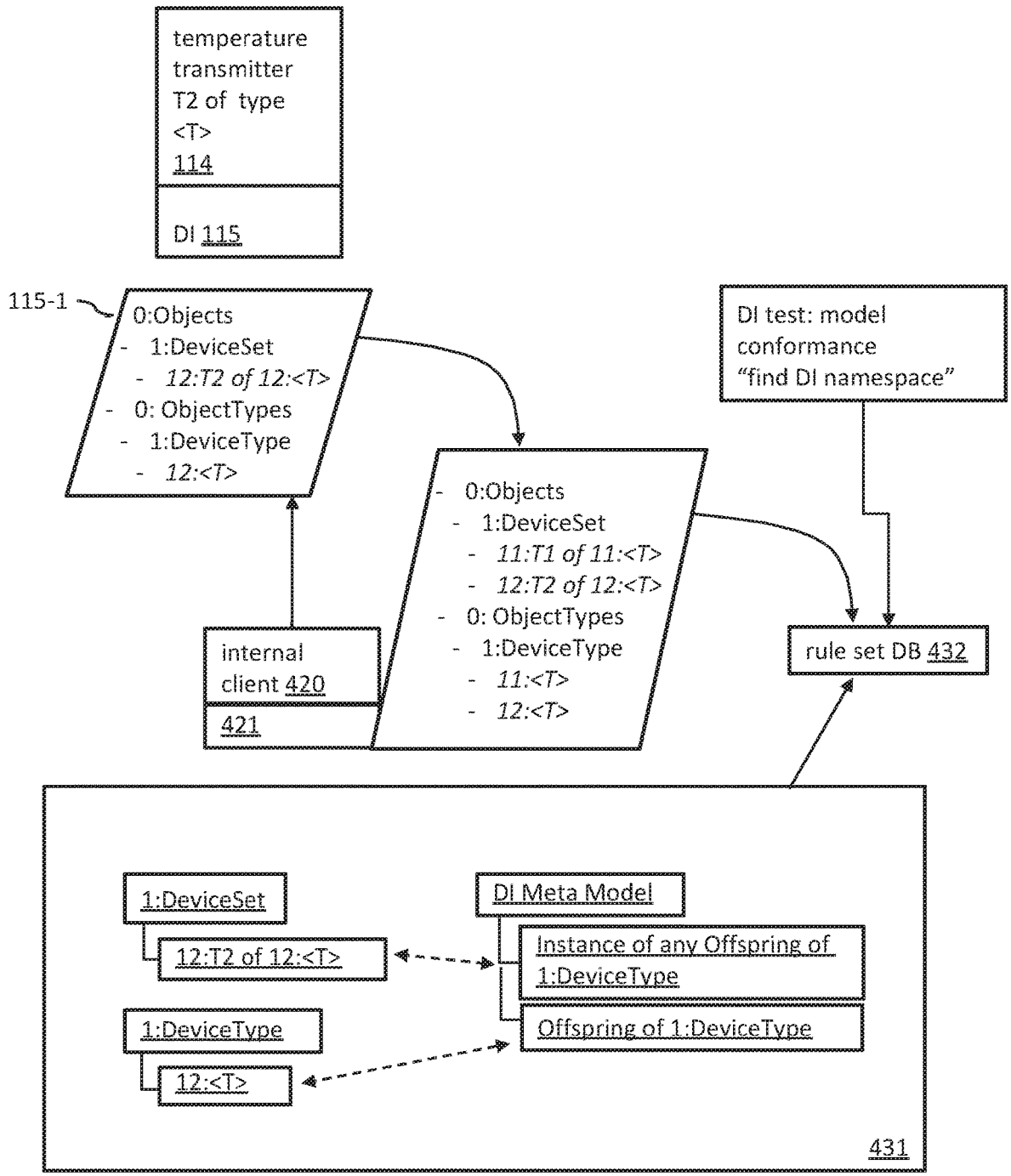
FIGS. 5A, 5B illustrate the specific temperature transmitter example with model aggregation for multiple transmitters.
Figure 5B:
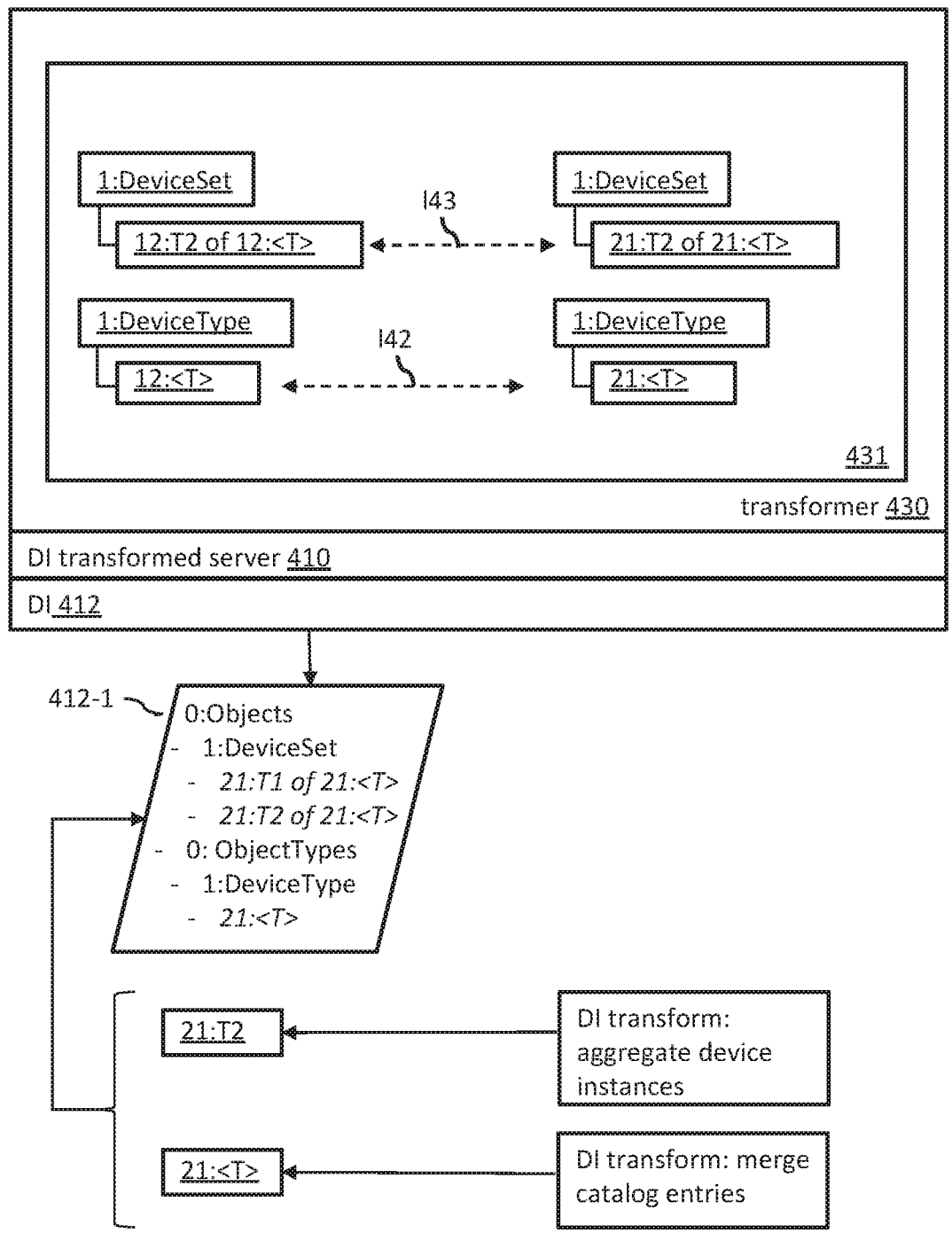

FIG. 5A is building on the situation in FIG. 4D. That is, the mapping 431 generated in FIGS. 4A to 4D is still present but not shown for easier reading of FIG. 5A, B. A further temperature transmitter T2 114 (server) is now added to the automation system. T2 has a server data model DI 115 also follows the DI technical specification with the following structure 115-1:

```
-0:Objects
  - 1:DeviceSet
    - 12:T2 of 12:<T>
  - 0: ObjectTypes
    - 1:DeviceType
      - 12:<T>
```

The computer system 400 again obtains a reference to the added server 114 and loads at least parts of the server data model 115 into the ingestion model. The ingestion model 421 overlays all received input models 113, 115, for example, by using namespaces to maintain uniqueness also for overlapping/redundant copies such as the type <T>, which is semantically the same in T1 and T2. The "find DI namespace" rule of the DI test rule package may be used for such purpose. In the example, the ingestion model 421 has the following structure after the replication of the T2 server data model:

```
-0:Objects
  - 1:DeviceSet
    - 11:T1 of 11:<T>
    - 12:T2 of 12:<T>
  - 0: ObjectTypes
    - 1:DeviceType
      - 11:<T>
      - 12:<T>
```

The duplicated device type in the ingestion model cannot be understood by the client, as the client data model does not expect such a duplication. Therefore, a model transformation is necessary in this case even if the server data models have the same structure as the client data model. That is, even if client and servers follow the same meta models, in case of model aggregation the resulting ingestion model may be different and not be compatible anymore with the client data model. Turning briefly to FIG. 8, the figure shows the DeviceType definition table 700 from the "OPC UA for Devices" companion specification (i.e. a software domain object type). Semantically (i.e. in the application domain), types inheriting from DeviceType (derived model element types) are identical if, for example, manufacturer, model, device/software/hardware revision are identical. For this reason, meta-model-specific business logic may be required to de-duplicate the types when aggregating the data models because, within the software domain type system, two device types cannot be compared based on just the type name.

In the following, again the relevant meta-model references can be inferred for the model elements of T2 by the analyzer. This procedure is equivalent to the derivation of the model element types for T1. The transformation rules can then be applied by considering the already existing output of the transformed server 410. The transformation rule set "DI transform: merge catalog entries" includes a transformation rule for de-duplicating the existing type <T> from the ingestion model. As a result, the output model DI 412 now contains two individual device instance T1 and T2 and a de-duplicated type <T> within the namespace #21 of the transformer 430 according to the structure 412-1:

```
-0:Objects
    - 1:DeviceSet
        - 21:T1 of 21:<T>
        - 21:T2 of 21:<T>
    - 0: ObjectTypes
        - 1:DeviceType
            - 21:<T>
```

It is to be noted that the output model of the transformed server has its own server specific namespace for the aggregated instances and/or types which is entirely independent from the namespace(s) used by the original data source server(s).

Figure 6:
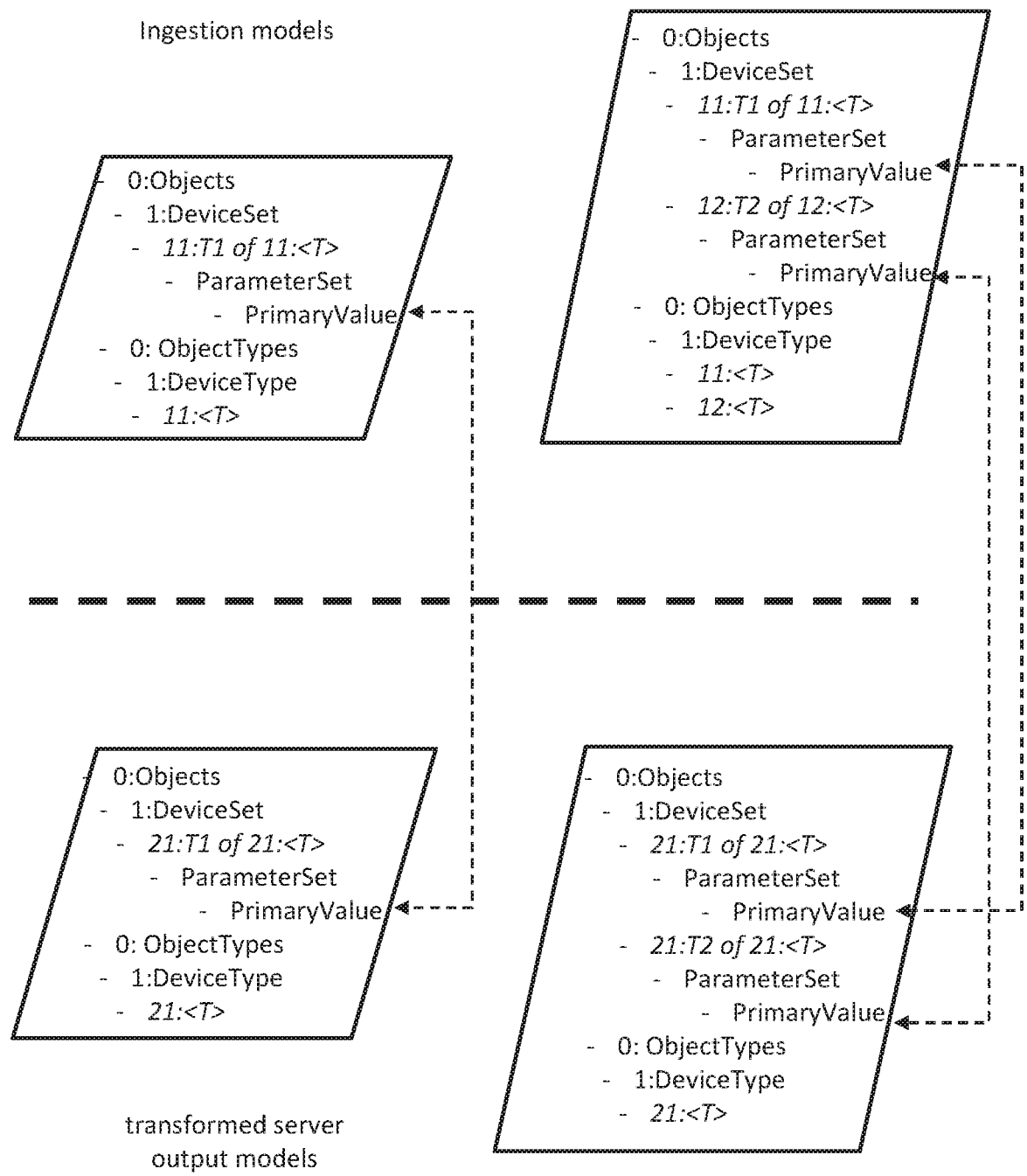
FIG. 6 illustrates examples for parameter value mapping according to various embodiments.

FIG. 6 extends the examples illustrated in FIGS. 4* and 5* by further adding parameter values to the server data models which need to be propagated to the client data model. In the upper part of FIG. 6 (above the dashed line) the respective ingestion models are shown. On the left hand, the ingestion model is illustrated after the data model of T1 was replicated. On the right hand, the ingestion model is shown after also replicating the data model of T2 into an aggregated ingestion model. In both cases, temperature submitters provide a PrimaryValue as part of a ParameterSet. In the lower part of FIG. 6 (below the dashed line), the output models of the transformed server are shown. When changes occur in primary values of the parameter set of a server the changed values need to be propagated to the client. Therefore, the transformation rules when applied to the corresponding data models generate additional mapping relations between the corresponding parameter value model elements (illustrated by the dashed double-arrows). To support data propagation/forwarding (e.g., read/write, alarms/events, publish/subscribe), a tracing (or trace model) can be maintained between the ingestion model in the internal client and the new output model of the transformed server. This tracing connects entities like objects, variables, reference, types, etc. of the output model to corresponding entities of the input model, allowing the transformer 230 to exchange data between clients and servers without re-running the model transformation. In other words, once the mapping has been established by the transformer, for such cases where the input data model(s) of the original data source server(s) stay stable, data traffic is simply forwarded to the output model of the transformed server via the trace model as defined by the generated mapping. However, in cases of changes in the input model(s) or in cases of the appearance of additional new data source servers further transformations are executed during the operation of the transformation computer system. It is to be noted that the transformer module may also include (business) logic to add arithmetic operations into the data exchange path between the ingestion model and the transformed output. For example, such logic may be used to perform value conversions for values in accordance with different units of measures used in the source and target models. For example, when a source temperature value is provided with a unit of measure "Celsius" and the target temperature value is expected in "Fahrenheit", corresponding logic is performed together with the model transformation to convert the respective temperature value accordingly.

As shown in the above example, new servers may be instantiated while the transformation computer system 400 is in operation. For example, in case of aggregation of an FDI server, a new device may be instantiated. The internal client obtains a reference to this new device. This may trigger a "topology change event" causing the transformation computer system to analyze the changed topology element (e.g., in the corresponding ingestion model). Based on the change analysis result the corresponding transformation rules can be executed with regards to the new device. That is, the corresponding transformation rules may support incremental transformation of the ingestion model where the transformation is only applied to such elements associated with the new device. Such transformation rules supporting incremental transformation can be limited in their execution to the new instance and the associated types.

Figure 7A:
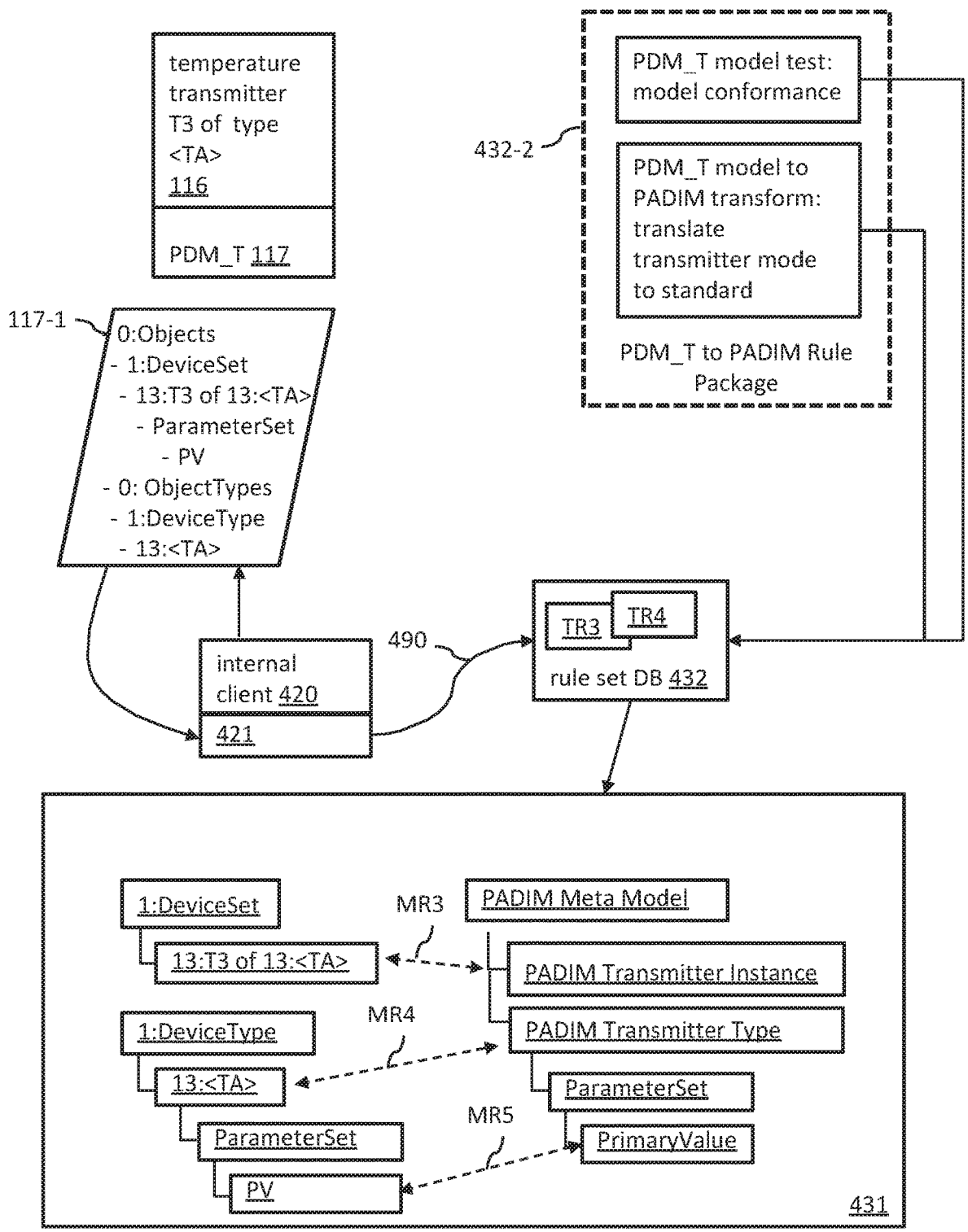
FIGS. 7A, 7B illustrate a specific transformation from a manufacturer-specific data model into a standard model.
Figure 7B:
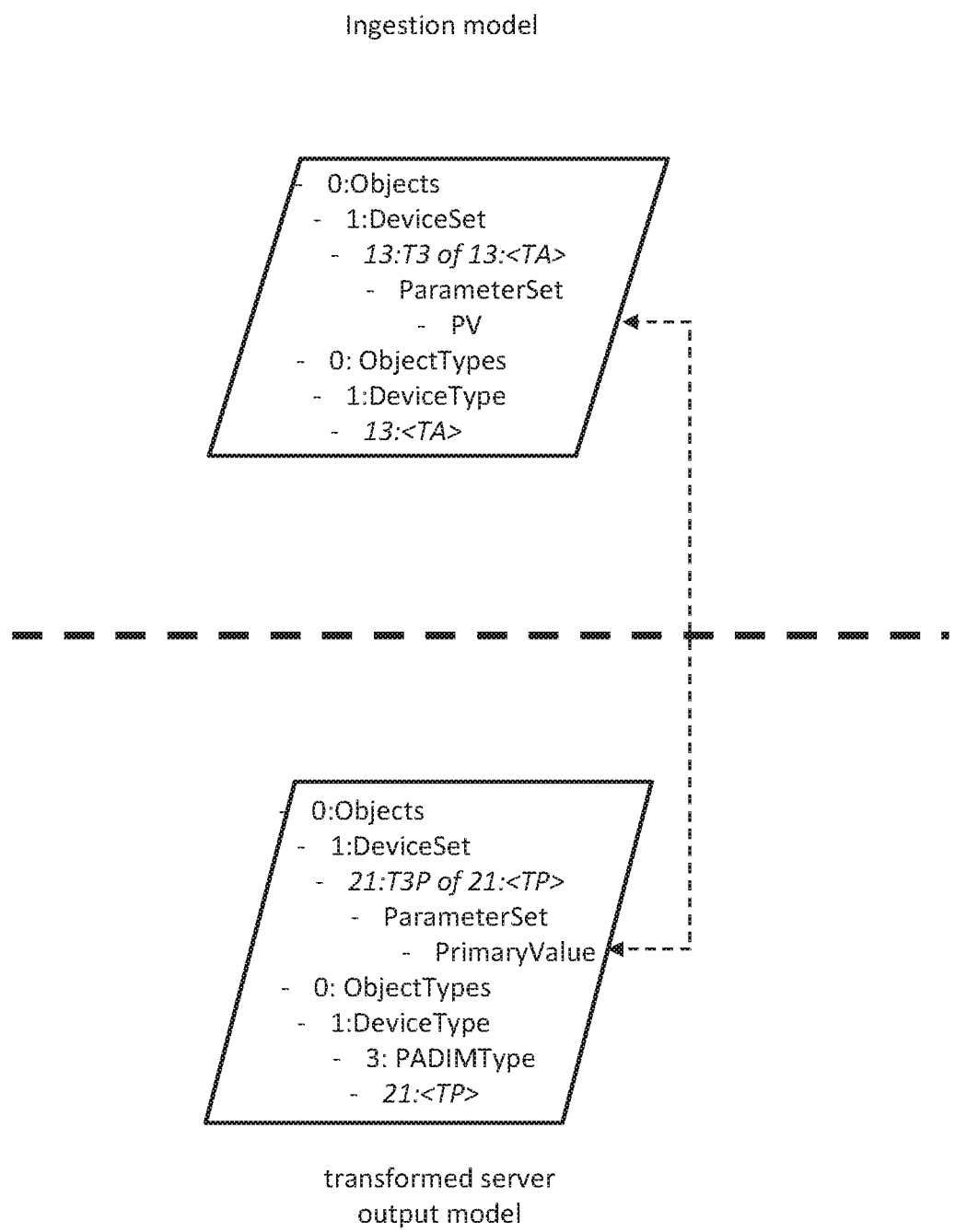

FIGS. 7A, 7B illustrate a transformation example from a manufacturer-specific proprietary data model PDM_T based on the DI standard model into a data model complying with the technical specification of the PADIM standard. A temperature sensor T3 116 of type TA is plugged into the automation system. TA uses a proprietary data model PDM_T 117. After the reference to T3 has been obtained by the transformation computer system, the following data model PDM 117 is loaded into the ingestion model 421 of the internal client 420:

```
- 0:Objects
    - 1:DeviceSet
        - 13:T1 of 13:<TA>
            - ParameterSet
                - PV
    - 0: ObjectTypes
        - 1:DeviceType
            - 13:<TA>
```

The rule set DB 432 has transformation rule sets TR3, TR4 which include the PDM_T to PADIM transformation rule package 432-2 with at least a transformation rule "PDM_T model test" for testing the model conformance, and the transformation rule "PDM_T to PADIM transform" to translate the transmitter proprietary data model PDM_T into the PADIM standard data model. The analyzer infers the relevant meta-model references MR3, MR4, MR5 between the model elements in the proprietary server data model on the left hand and the corresponding model element types as defined in the PADIM meta-model (technical specification PADIM) on the right hand. Thereby, device type <TA> resides in the server-specific PDM namespace "13:". T3 is an instance of the device type <TA>. From the PADIM meta model the MR3 reference refers to the type PDM_T Transmitter Instance and the MR4 reference refers to the type PDM_T Transmitter Type and the MR5 reference refers to the PDM_T PrimaryValue, which is however not specified by the DI model standard (on which PDM_T is based). In the derived proprietary model PDM_T is only called "PV". When now executing the PDM Rule Package the corresponding mapping between respective model elements is generated similarly to the previously explained embodiments. In this case, it also includes translating the proprietary variable name PV to the PADIM-standard-conforming PrimaryValue according to knowledge encoded into the transformation rule on type level.

The result of the transformation based on said mapping is shown in FIG. 7B where the following transformed server output model complies with the PADIM standard (showing the translated variable name on the instance level):

```
- 0:Objects
    - 1:DeviceSet
        - 21:T3P of 21:<TP>
            - ParameterSet
                - PrimaryValue
- 0: ObjectTypes
    - 1:DeviceType
        - 3: PADIMType
            - 21:<TP>
```

Thereby, device, parameters and types of the PDM_T ingestion model are transformed into the corresponding model elements in the PADIM namespace.

Figure 9:
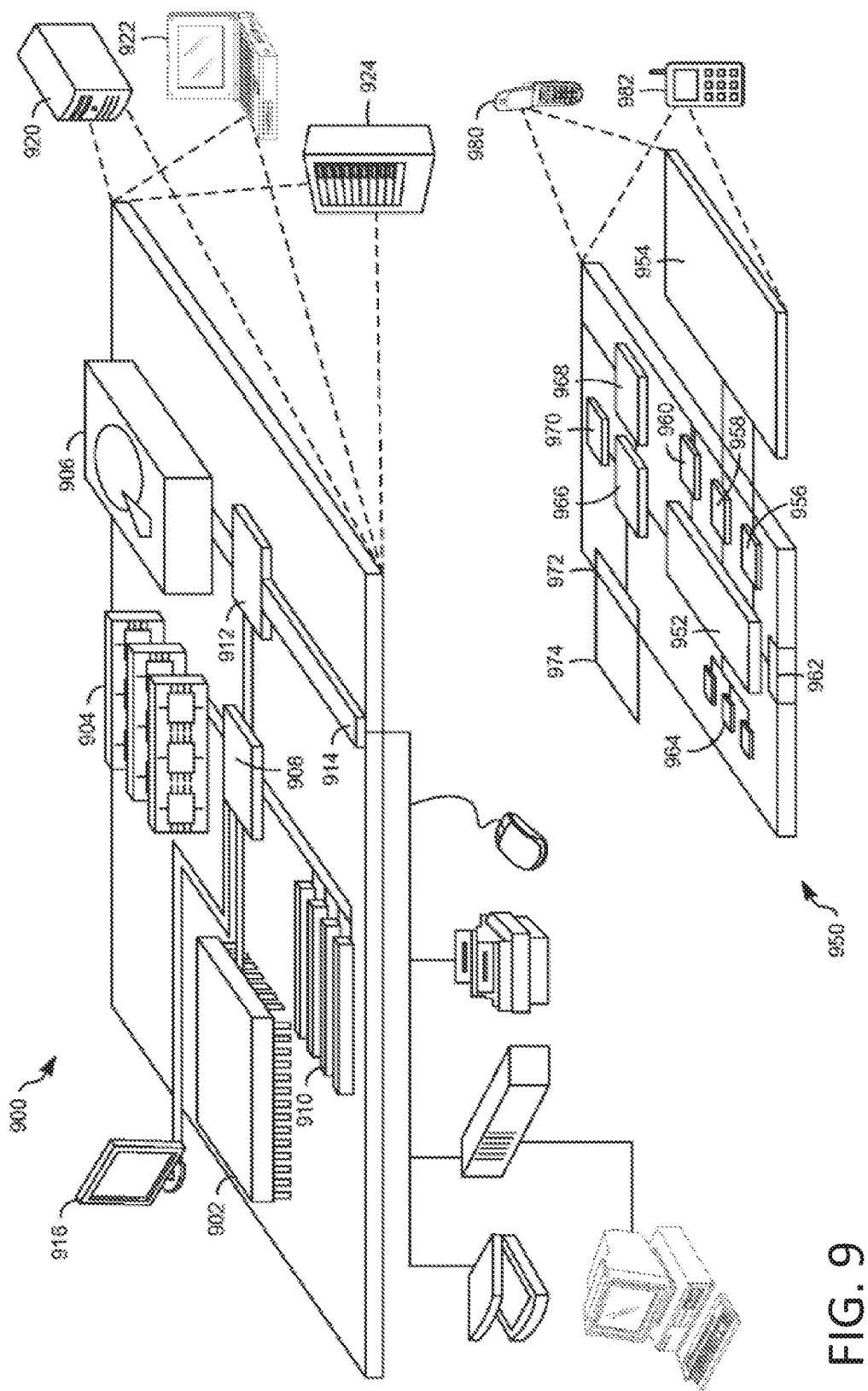
FIG. 9 is a diagram that shows an example of a generic computer device and a generic mobile computer device, which may be used with the techniques described herein.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 200 of FIG. 1. Computing device 950 is intended to represent various forms of mobile devices, such as personal digital assistants, cellular telephones, smart phones, and other similar computing devices. For example, computing device 950 may be a user frontend for a user to interact with the computer device 900. The components shown here, their connections and relationships, and their functions, are meant to be exemplary only, and are not meant to limit implementations of the inventions described herein.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards. In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device, such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver. In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for interoperable communication between a server and a client, at least one of the server and the client being a component of an automation system, the server being associated with a corresponding server data model, and the client being associated with a corresponding client data model, the method comprising:
   obtaining a reference to the server;
   analyzing structure and output of the server to derive, based on at least a first technical specification associated with the server, one or more element types defined in at least the first technical specification and associated with elements of the corresponding server data model;
   generating at least a partial mapping between the corresponding server data model and the corresponding client data model by applying a transformation rule set to the corresponding server data model, the transformation rule set defining for the one or more derived element types how instances of the one or more derived element types are to be transformed from the corresponding server data model associated with the at least first technical specification into instances of the corresponding client data model associated with at least a second technical specification; and
   exchanging data between the server and the client via the at least partial mapping.

2. The method of claim 1, wherein obtaining the reference further comprises:
   performing a discovery with a discovery mechanism adapted for the automation system to discover available components of the automation system; and
   receiving references to the discovered available components including the reference of the server.

3. The method of claim 1, wherein the analyzing structure and output of the server further comprises:
   analyzing, based on the at least first technical specification, any one of data model structure elements: namespaces, annotations, semantic annotations referencing technical specifications, object types, type hierarchies, type/instance relationships, and references within the corresponding server data model.

4. The method of claim 1, further comprising:
   generating an ingestion model replicating at least partially the corresponding server data model,
   wherein the ingestion model is used as input for generating the at least partial mapping.

5. The method of claim 4, wherein a further server provides a further server data model, and generating the ingestion model comprises concurrently storing the corresponding server data model and the further server data model.

6. The method of claim 1, further comprising:
   monitoring changes in the output and/or a model structure of the server;
   if the output change is detected, triggering a data update; and
   if the model structure change is detected, triggering a model transformation to modify the at least partial mapping.

7. The method of claim 6, wherein transformation rules are only executed on model elements of the server which are affected by the detected changes.

8. The method of claim 7, further comprising:
   upon reconnection to a previously failed server, analyzing a model change event log on the server to determine whether a gapless history of server model changes is buildable.

9. The method of claim 1, further comprising:
   detecting a failure of the server affecting one or more output values of a transformation; and
   annotating the one or more affected output values with a respective bad-data-quality indicator while freezing a value associated with the good-data-quality state of the particular server.

10. The method of claim 1, where exchanging data comprises any one of: reading variable values, writing/updating variable values; creating or deleting variables, structural objects, references between objects and/or variables, creating or deleting data, variable, object, or reference types; publishing and receiving values of variables or topics; publishing, receiving, and acknowledging alarms or events; calling methods or remote procedures.

11. A computer program product comprising instructions that, when loaded into a memory of a computing device and executed by at least one processor of the computing device, execute the method steps of the computer implemented method according to claim 1.

12. A computer system for interoperable communication between a server and a client, at least one of the server and the client being a component of an automation system, the server being associated with a corresponding server data model, and the client being associated with a corresponding client data model, the computer system communicatively coupled with a technical specifications database, the computer system comprising:
   an interface configured to obtain a reference to the server and to establish the interoperable communication with the server via the obtained reference;
   a transformer module comprising:
   an analyzer configured to analyze structure and output of the server to derive, based on at least a first technical specification associated with the server and provided by the technical specifications database, one or more element types defined in at least the first technical specification and associated with elements of the corresponding server data model;
a rule set database comprising a plurality of transformation rule sets associated with the technical specifications database, a particular transformation rule set having one or more transformation rules defining, for the one or more element types derived from the corresponding server data model, how instances of the element types are to be transformed from the corresponding server data model associated with at least a first technical specification into instances of the corresponding client data model associated with at least a second technical specification of the technical specifications database; and
a rule engine configured to apply the particular transformation rule set to the corresponding server data model to generate at least a partial mapping between the corresponding server data model and the corresponding client data model,
wherein the interface is configured to exchange data between the server and the client via the at least partial mapping.

13. The computer system of claim 12, further comprising:
an internal client configured to replicate at least partially the corresponding server data model, an ingestion model being associated with the at least first technical specification being used as input for the transformer module,
wherein the transformer module is configured to instantiate a transformed server associated with the at least second technical specification to provide a transformed output of the server to the client in accordance with the corresponding client data model.

14. The computer system of claim 13, wherein a further server provides a further server data model, and the ingestion model is further configured to concurrently store the corresponding server data model and the further server data model.

15. The computer system of claim 12, wherein the analyzer is further configured to:
monitor changes in the output and/or a model structure of the server;
if the output change is detected, trigger a data update; and
if the model structure change is detected, trigger a model transformation to modify the at least partial mapping.

16. The system of claim 12, wherein the transformer module is further configured to add business logic including arithmetic operations into a data exchange path between an ingestion model and a transformed output.

\* \* \* \* \*